UNITED STATES PATENT OFFICE.

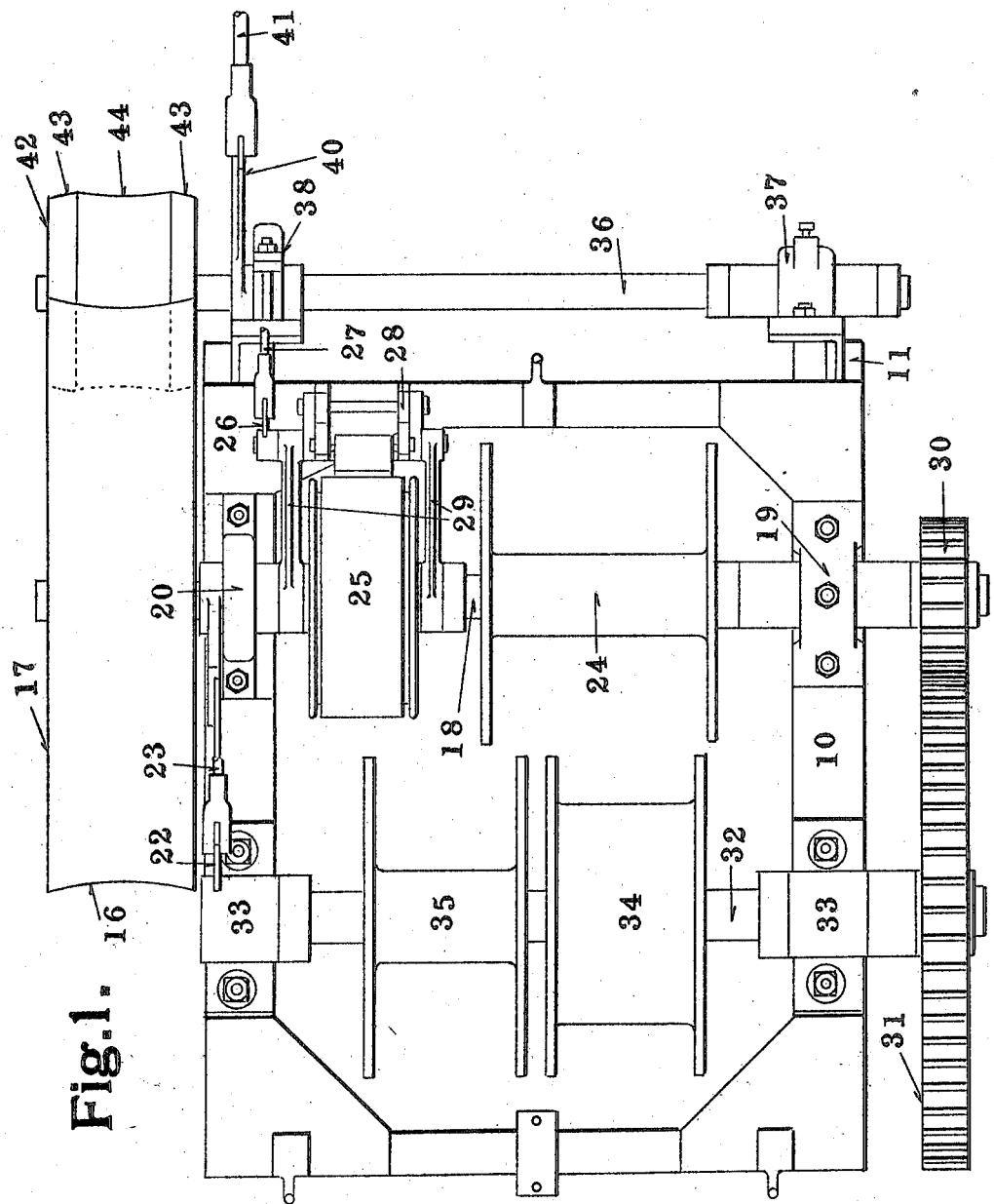

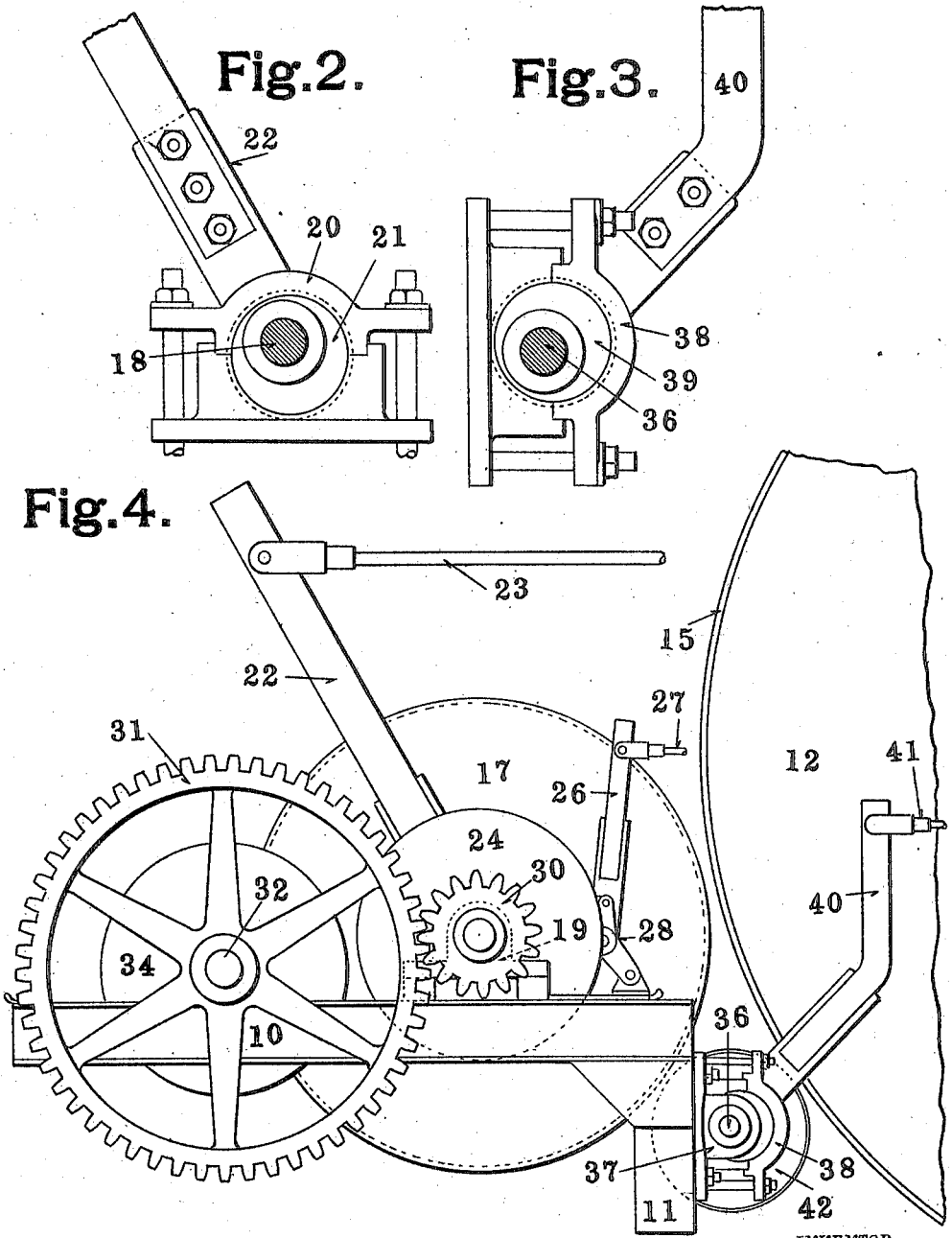

EDWARD L. DILLON, OF ST. LOUIS, MISSOURI, ASSIGNOR TO LORENZO NORVELL, TRUSTEE, OF ST. LOUIS, MISSOURI.

WELL-DRILLING MACHINE.

1,393,350.   Specification of Letters Patent.   Patented Oct. 11, 1921.

Application filed January 2, 1919. Serial No. 269,188.

*To all whom it may concern:*

Be it known that I, EDWARD L. DILLON, a citizen of the United States of America, residing at the city of St. Louis, State of Missouri, United States of America, have invented a certain new and useful Well-Drilling Machine, of which the following is such a full, clear, and exact description as will enable any one skilled in the art to which it appertains to make and use the same, reference being had to the accompanying drawings, forming part of this specification.

My invention relates to a well-drilling machine and more particularly to friction driving and reversing gearing for actuating the hoisting drums of such machines.

In the accompanying drawings which show as much of a well drilling machine as is necessary to illustrate my invention, Figure 1 is a top plan view of a portion of my device. Fig. 2 is an enlarged detailed view of the eccentric for shifting the main friction wheel. Fig. 3 is an enlarged detailed view of the eccentric for shifting the reversing wheel, and Fig. 4 is a side elevation of the parts shown in Fig. 1.

10 indicates a frame which is preferably formed of structural iron and which is provided at one end with a downwardly extending portion 11. This frame together with its downwardly extending portion carries the various parts of the machine illustrated with the exception of the band wheel 12.

The band wheel 12 in place of being provided with a flat tread in the usual manner is provided in a convex tread 15 adapted to engage with a corresponding concave tread 16 on the main friction wheel 17. The friction wheel 17 is carried on a shaft 18 mounted on bearings 19 and 20 carried on the frame 10. The bearing 19 may be any usual form of a ball and socket bearing. The bearing 20, shown in detail in Fig. 2, is provided with an eccentric 21 so arranged as to move the shaft 18 forwardly when the eccentric is rotated by means of an arm 22 attached to a control rod 23, and thus move the friction wheel 17 into contact with the band wheel 12 to rotate the shaft 18. Mounted on the shaft 18 is the hoisting drum 24 and a band brake 25. The band brake 25 is operated by a lever 26 attached to a control rod 27. The operating mechanism 28 for the band brake 25 is connected with the shaft 18 by means of arms 29 so that the said operating mechanism moves with the shaft 18 and consequently the operation of the band brake is not interfered with by the movement of said shaft.

The end of the shaft 18 opposite the friction wheel 17 is provided with a pinion 30 meshing with a gear 31 on a shaft 32 carried in bearings 33 fixed on the frame 10. This shaft 32 is provided with a rod hoisting drum 34 and a tube hoisting drum 35. It is to be noted that some play should be allowed between the pinion 30, and the gear 31 owing to the movement imparted to the shaft 18 by the cam 21. Inasmuch, however, as the distance of the pinion 30 from the ball and socket bearing 19 is comparatively short this movement is very small and will not interfere with the proper meshing of gears.

In order to reverse the mechanism I provide a shaft 36 journaled in bearings 37 and 38, respectively, carried on the downwardly projecting portion 11 of the frame 10. The bearing 37 is a ball and socket bearing like the bearing 19, herein before referred to, while the bearing 38 is similar to the bearing 20 herein before described, and is provided with an eccentric 39 which is so arranged, as best shown in Fig. 3, as to move the shaft in an upward direction when it is actuated by means of an arm 40 attached to a control rod 41. Mounted on the end of the shaft 36 is a reversing wheel 42 provided adjacent to its edges with convex bearing faces 43 adapted to engage with the concave face 16 of the wheel 17 and at its central part with a concave face 44 adapted to engage with the convex periphery 15 of the band wheel 12.

The operation of my machine is as follows: When the parts are in position as shown in Fig. 4 of the drawings, the drums 24, 34, and 35 will not be actuated by the rotation of the band wheel 12. When it is desired to drive the drums in a forward direction the control rod 23 is drawn forward to actuate the cam 21 and thus move the end of the shaft 18 carrying the wheel 17 in a forward and upward direction so as to bring its periphery into contact with the tread of the band wheel 12. Owing to the curved cross section of the treads of these wheels a much better frictional contact will be obtained than would be possible with wheels provided with flat treads. When the wheel 17 is drawn forward to engage with the band wheel 12 it may or may not come in contact with the periphery of the reversing wheel 42 as this wheel in its normal position is out of contact with the band wheel. When, however, it is desired to reverse the direction of rotation of the drums, the lever 22 is allowed to remain in the position shown in Fig. 4 while the lever 40 is drawn forward by means of the control rod 41 so as to actuate the eccentric 39 to throw the end of the shaft 36 upward and thus bring the reversing roll 42 simultaneously into contact with the wheels 17 and 12 thus imparting reverse motion to the drums.

Having fully described my invention what I claim as new and desire to secure by Letters Patent of the United States is:

1. In a well drilling machine, the combination with a band wheel having a convex tread adapted to contact with a flat driving belt, of a friction wheel having a concave tread, means for moving said wheels into and out of contact, a reversing wheel having a part of its tread concave and another part convex, and means for moving said reversing wheel into and out of contact with said band and friction wheels.

2. In a well drilling machine, the combination with a band wheel, of a friction wheel, a shaft carrying said friction wheel, a hoisting drum on said shaft, means for moving said shaft to bring said friction wheel into contact with said band wheel, a brake for said shaft, and operating mechanism for said brake connected to and moving with said shaft.

In testimony whereof, I have hereunto set my hand and affixed my seal.

EDWARD L. DILLON. [L. S.]